United States Patent [19]

Frye et al.

[11] Patent Number: 4,882,807
[45] Date of Patent: Nov. 28, 1989

[54] ARMREST TORQUE CONTROL

[75] Inventors: Dale J. Frye; Alan L. Kindig; Kenneth M. Lindberg; Robert J. Stander, all of Holland, Mich.

[73] Assignee: Prince Corporation, Holland, Mich.

[21] Appl. No.: 217,171

[22] Filed: Jul. 11, 1988

[51] Int. Cl.$^4$ ............................................. E05D 11/10
[52] U.S. Cl. ....................................... 16/225; 16/321;
16/334; 16/342; 16/338; 16/348; 16/360;
16/361; 16/382; 16/387; 16/386; 16/DIG. 13;
220/335; 296/153; 297/376; 403/98
[58] Field of Search ................. 16/225, 321, 325, 332,
16/334, 338, 342, 343, 348, 351, 337, 331, 357,
360, 361, 386, 387, 385, DIG. 13; 220/335, 338,
339; 296/153; 292/272, 275; 297/115, 116, 117,
376; 403/98

[56] References Cited

U.S. PATENT DOCUMENTS

| 3,231,927 | 2/1966 | Ammon | 16/331 |
| 4,239,093 | 12/1980 | Eubanks | 220/335 |
| 4,485,524 | 12/1984 | Neville | 16/342 |
| 4,572,401 | 2/1986 | Grenier | 220/335 |
| 4,725,089 | 2/1988 | Langer . | |
| 4,734,955 | 4/1988 | Connor . | |

FOREIGN PATENT DOCUMENTS 2576559  8/1986  France ................... 16/225

Primary Examiner—Richard K. Seidel
Assistant Examiner—Edward A. Brown
Attorney, Agent, or Firm—Price, Heneveld, Cooper, DeWitt & Litton

[57] ABSTRACT

A torque control for providing a desired frictional resistance to a pivotally mounted vehicle accessory, such as an armrest or headrest, which includes a resilient member having an irregular arcuate slot. A resistance element extends in the slot to move along the length thereof as the pivoted component pivots about the pivot axis. The shape of the slot provides a desired predetermined frictional resistance.

22 Claims, 2 Drawing Sheets

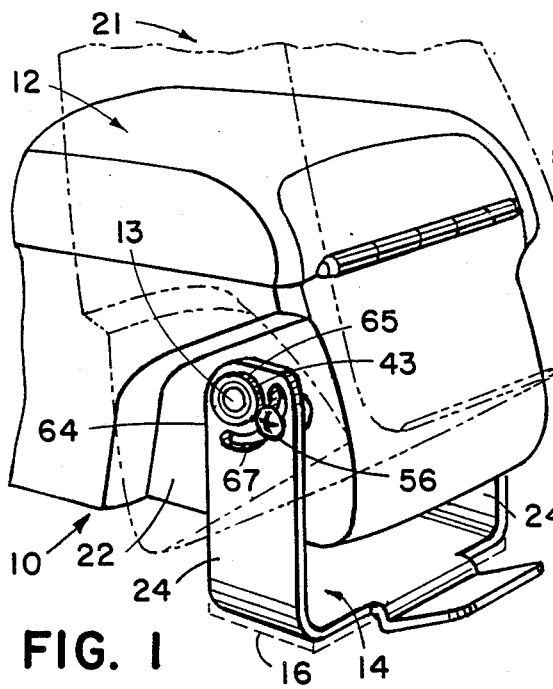
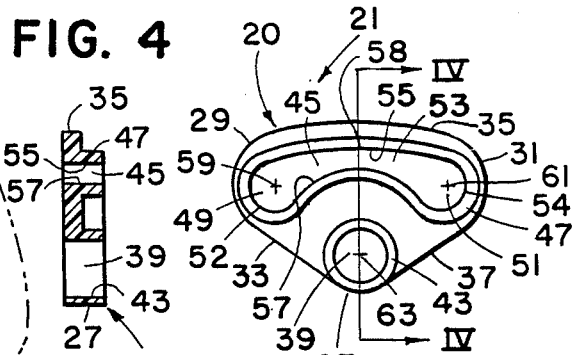
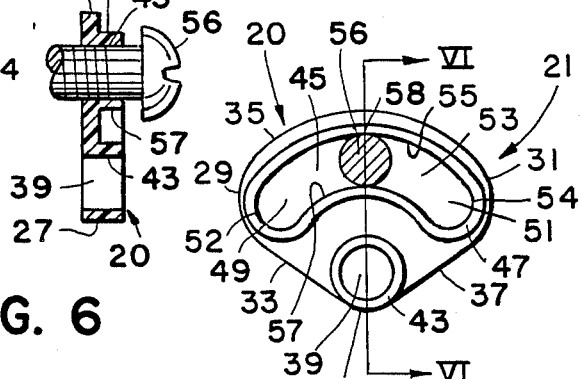
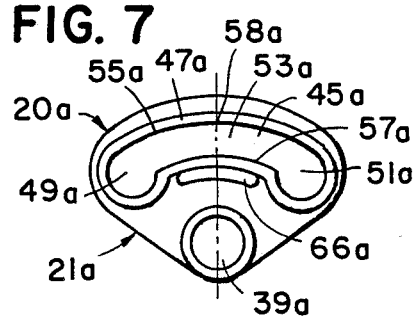
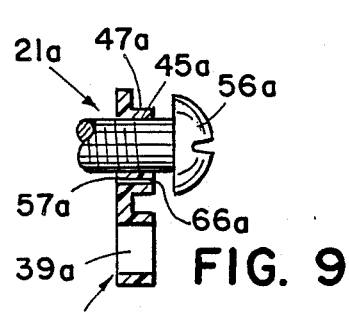
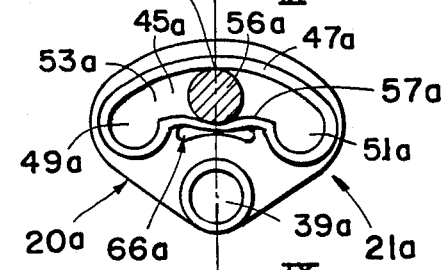
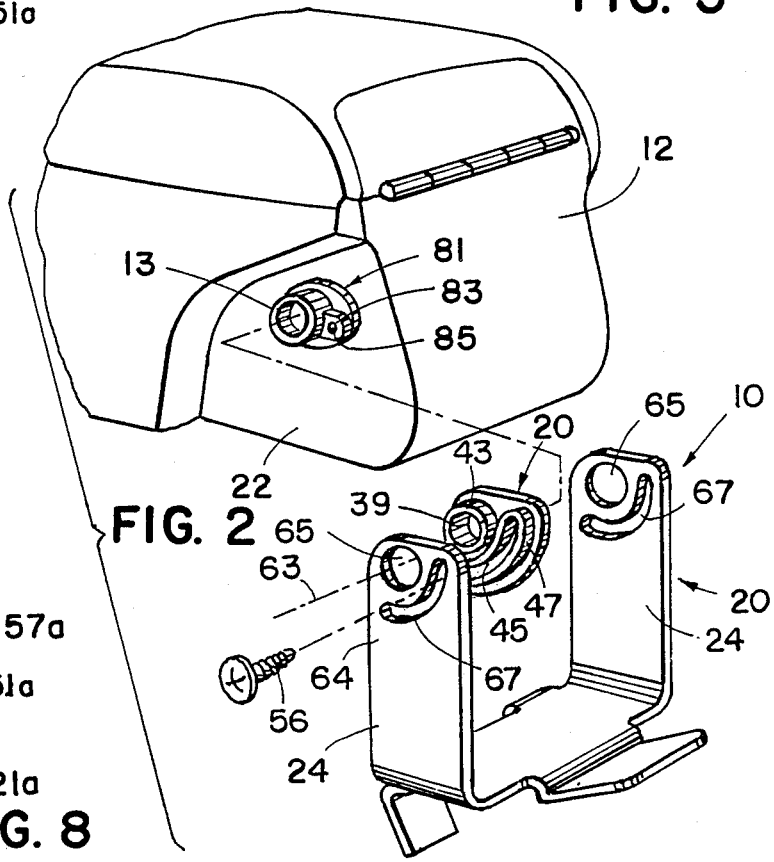

ARMREST TORQUE CONTROL

BACKGROUND OF THE INVENTION

The present invention pertains to torque controls, and in particular to a torque control specially suited for providing a desired frictional resistance to a pivotally mounted armrest, headrest or other articulated vehicle accessory.

Many vehicular components, as well as elements in other fields, are mounted for selective controlled pivotal movement. Often it is desirous to frictionally attach the component to provide either a controlled movement between set positions or an adjustment capacity which permits the user to adjustably position the component at specific locations. Previously, frictional forces have generally been provided by a relatively tight frictional engagement between opposing washers or the like, along the pivot pin, axle, etc. Further, provision of adjustment capabilities has often been provided by a mechanical, spring biased detent structure. However, all of these arrangements require the manufacture and assembly of a multiple of parts which, in turn, causes an increase in fabrication costs. Also, with extended use these systems tend to loosen and wear, which thereby decreases their effectiveness and may cause rattling of the joint parts.

In an effort to alleviate the shortcomings of the previous systems, torque controls including resilient plastic tubular members which are stretched or distorted by a rotating cam-like axle have been developed. An example of such a device is illustrated in U.S. Pat. No. 4,734,955 issued Apr. 5, 1988 to Connor, and entitled HINGE MECHANISM FOR A VEHICLE VISOR. However, these systems require the specific irregular shaping of both connector elements (i.e., the shaft and socket elements) which create additional manufacturing costs. Also, the amount of resistance which may be offered is limited, due to the small moments engendered by providing the frictional resistance almost coincident with the rotational axis.

SUMMARY OF THE INVENTION

The aforementioned problems are overcome in the present invention, wherein frictional pivotal mounting is effected through the use of a specially configured, resilient torque control which easily and efficiently supports a component for controlled movement.

The torque control of the present invention includes a generally planar member formed of a resilient lubricious polymeric material which includes an arcuate slot radially spaced from the pivot axis of the articulated component. The resilient member is attached to either the pivoted component or the support structure mounting the component, and receives through the slot a pin attached to the other of the component or support. The slot is configured with a width of less dimension than the width of the pin to thereby establish a frictional compressive interference fit therebetween. Hence, as the pin is passed through the slot during pivotal movement of the component, the slot is distorted and, consequently, frictionally resists the movement with the desired resistance force.

According to a second aspect of the invention, the slot may be provided with one or more enlarged portions adapted and sized to receive the pin without substantial distortion of the slot. These portions act to index and releasably hold the component in particular orientations.

By using the torque control of the present invention, an efficient and economical control of a pivoted component is achieved. The present torque control includes only one specially configured, irregular element and a minimum of total parts, to substantially decrease the manufacturing and assembling costs. Further, the resistance force is spaced from the pivot axis, to enhance the offsetting of greater forces than heretofore possible. Moreover, the torque control has no propensity for subsequent rattling, and is not susceptible to premature wearing and loosening of the frictional connection.

These and other objects, advantages and features of the present invention will be more fully understood and appreciated by reference to the written specification and appended drawings.

BRIEF DESCRIPTION OF THE DRAWINGS

FIG. 1 is a perspective view of the present invention assembled into an armrest coupling assembly;

FIG. 2 is an exploded view of FIG. 1;

FIG. 3 is a front elevational view of a torque control plate of the present invention;

FIG. 4 is a cross-sectional view taken along line IV—IV in FIG. 3;

FIG. 5 is a front elevational view of the torque control plate of FIG. 3 in an operating position;

FIG. 6 is a cross-sectional view taken along line VI—VI in FIG. 5;

FIG. 7 is a front elevational view of a second embodiment of a torque control plate of the present invention;

FIG. 8 is a front elevational view of the torque control plate of FIG. 7 in an operating position;

FIG. 9 is a cross-sectional view taken along line IX—IX in FIG. 8;

DETAILED DESCRIPTION OF THE PREFERRED EMBODIMENTS

Figure 13:
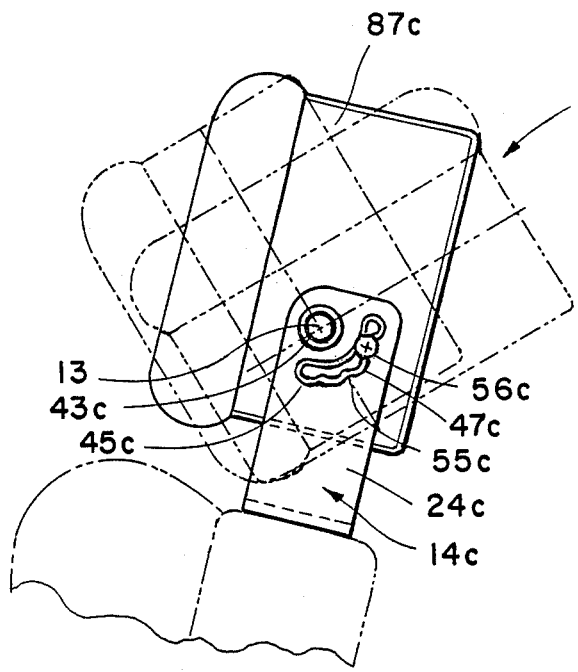
FIG. 13 is a side elevational view of a fourth embodiment of a torque control plate assembled into a vehicular headrest coupling assembly.

In the preferred embodiment, torque controls 10 are utilized to control the pivotal movement of a vehicular component, such as armrest 12 (FIGS. 1 and 2), about a pivot pin 13 facilitating coupling to support structure 14. Although not required, structure 14 is typically secured to the vehicle 16 along the central portion of a bench-type seat.

Torque control 10 includes a generally planar, resilient member or plate 20 received between sides 22 of armrest 12 and upstanding legs 24 of structure 14 (although only one torque control is shown in FIG. 2). More specifically, plate 20 (FIGS. 1–6) is composed of a resilient polymeric material having a good memory, such as polypropylene, but of course could be composed of other materials possessing the requisite characteristics. Plate 20, in a first embodiment 21, has a generally rounded triangular shape with three rounded corners 27, 29, 31, two substantially linear sides 33, 37 and a third side 35 which has a broad arcuate shape.

In corner 27 is formed a bore 39 adapted to receive therethrough pivot pin 13 coupling armrest 12 to structure 14 (FIGS. 2-6). An annular ridge 43 circumscribes bore 39 to enhance the structural integrity or plate 20 and enhance the mounting and positioning of plate 20 on support structure 14, as will be discussed in more detail below. An arcuate slot 45 is provided through plate 20 adjacent to and along the length of arcuate side 35. Arcuate slot 45 includes a marginal upstanding border 47 about its periphery which, like ridge 43, not only acts to increase the structural integrity and durability of plate 20, but also enhances its mounting and positioning on support structure 14.

Arcuate slot 45 bends around bore 39 in an irregular arcuate shape (FIGS. 3 and 5). More particularly, slot 45 includes a pair of enlarged end portions 49, 51 which are radially spaced an equal distance from bore 39. The outer halves 52, 54 of end portions 49, 51 are preferably semicircular in shape and have a diameter which substantially equals the width of a resistance element 56 projecting therethrough. Interconnecting end portions 49, 51 is an arcuate segment 53 which gradually narrows and flattens the slot 45 at its center 58. The configuration of segment 53 is defined by providing an outer arcuate edge 55 with a broad concave shape and an inner arcuate edge 57 with a sharper concave shape. Hence, the radius of curvature of the outer edge 55 is greater than the combined sums of the radius of curvature of the inner edge 57 and the width of the slot 45.

As an illustration only, first embodiment 21 may be shaped such that: the semicircular halves 52, 54 have a radius of 4.5 mm; the inner edge 57 has a radius of curvature of 15.64 mm; the outer edge 55 has a radius of curvature of 58.50 mm; and axes 59, 61 of end portions 49, 51 are radially spaced from axis 63 of bore 39 a distance of approximately of 20.14 mm. Nevertheless, many other changes and modifications to this structural arrangement may be made without departing from the spirit and scope of the invention.

To effect mounting and positioning of plate 20, legs 24 of structure 14 each include near their distal end 64 a circular hole 65 and an arcuate slot 67 (FIGS. 1 and 2). More specifically, ridge 43 is matingly received within hole 65 and border 47 is received within slot 67. The longitudinal length of slot 67 substantially equals the length defined by border 47 to thereby preclude any swinging motion of plate 20 about the pivot axis 63. However, to facilitate the expansion of slot 45 during operation thereof, slot 67 is of a uniform width slightly larger than the width of slot 45, and therefore does not possess a corresponding narrowing central portion.

In an alternate embodiment 21a (FIGS. 7-9), plate 20a possesses a differently configured arcuate slot 45a. More specifically, slot 45a still includes enlarged end portions 49a, 51a and a central arcuate segment 53a. However, in contrast to first embodiment 21, inner edge 57a has a greater radius of curvature than the radius of curvature of outer edge 55a. While this arrangement tends to gradually narrow the slot 45a toward ends 49a, 51a relative to its center 58a, the width of slot 45a is still smaller along the entire length of segment 53a than the width of guide element 56a movably received therethrough. To facilitate the requisite expansion and distortion of slot 45a as resistance element 56a passes through, plate 20a includes a deformation opening 66a. Deformation opening 66a lies directly adjacent the outside of marginal border 47a and allows the inner edge 57a to flex toward bore 39a during the passage of resistance element 56a.

Figure 10:
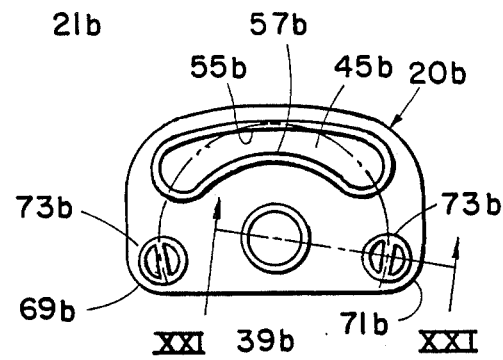
FIG. 10 is a front elevational view of a third embodiment of a torque control plate of the present invention.
Figure 11:
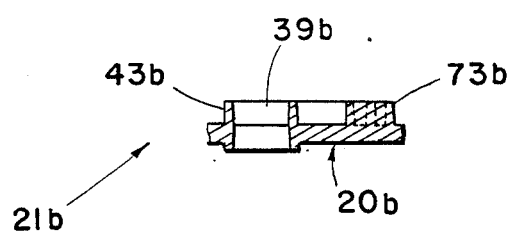
FIG. 11 is a cross-sectional view taken along line XI—XI in FIG. 10.

In a third embodiment 21b (FIGS. 10-11), resilient plate 20b is formed to define a generally rectangular shape, such that two corners 69b, 71b are spaced to each side of bore 39b. An outwardly projecting knob 73b is provided in each corner 69b, 71b to more effectively preclude the swinging of plate 20b about pivot axis 63. Without the provision of knobs 73b, the torque control 10 may be subject to a small amount of lost motion, due to a slight swinging of plate 20 caused by a resilient deformation of border 47 upon movement of the pivotally mounted component 12. Otherwise, the slot 45b and bore 39b are substantially the same as described for first embodiment 21.

Figure 12:
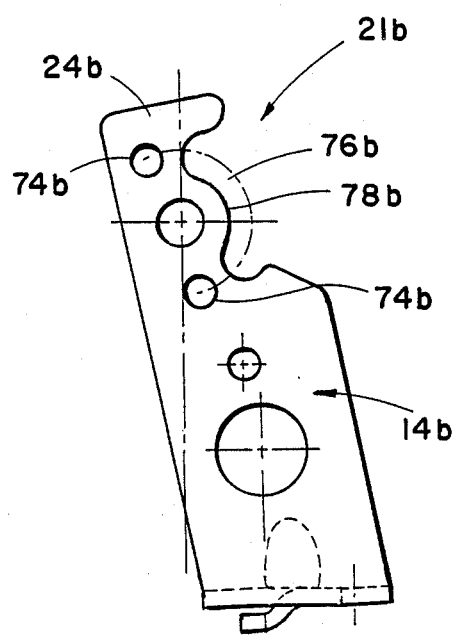
FIG. 12 is a side elevational view of a support structure for use with the third embodiment of the torque control plate.

To accommodate plate 20b of the third embodiment 21b, an alternative embodiment of the support structure 14b is utilized (FIG. 12). More specifically, structure 14b includes a pair of opposite upstanding legs 24b which receives therebetween armrest 12. At the free end 64b of each leg 24b is preferably provided a primary hole 65b through which pivot pin 13 is received, two secondary holes 74b matingly receiving knobs 73b for preventing the plate from swinging, and a recess 76b having a convoluted edge 78b adapted to matingly receive the marginal border 47b along the inner edge 57b of slot 45b.

In any of the embodiments 21, 21a, 21b, the ridge 43 and border 47, when trapped between the armrest 12 and leg 24, will securely hold plate 20 from any unwanted swinging movement which may tend to diminish the effectiveness of the torque control 10. However, if desired, additional fastening means (not shown) such as screws, adhesive, etc. may be employed to secure plate 20. With the use of separate fasteners, ridge 43 and border 47 could be eliminated, although such omission would detrimentally affect the strength and durability of plate 20 and the ease of positioning and assembling it in its proper position.

Torque control 10 further includes a base section 81, fixedly mounted to sides 22 of armrest 12, to cooperate with plate 20 in providing the desired frictional resistance (FIG. 2). Base section 81 may be fixedly attached to sides 22 in any known manner, such as through the use of bolts, adhesive, etc. (not shown). More specifically, base section 81 includes pivot pin 13, preferably in the form of a projecting annular ring Pivot pin 13 is sized and assembled for mating receipt within bore 39 and ridge 43. Also, adjacent to pin element 13 and extending laterally therefrom along base section 81 is an upraised boss 83 having a centrally located threaded bore 85, which is adapted to receive and threadedly secure therein the resistance element 56. Of course, the resistance element 56 may be secured to base section 81 by any known means. Alternatively, the resistance element 56 and pivot pin 13 may be secured directly to the sides 22 of armrest 12 by any known means or may even be formed directly with the sides 22, such as by a molding process.

In operation, torque control 10 is assembled such that leg 24, plate 20, base section 81 and armrest 12 are juxtaposed into close contiguous relationships with one another. More particularly, plate 20 is mounted within leg 24 such that ridge 43 and border 47 are received within hole 65 and slot 67, respectively. As discussed above, hole 65 and slot 67 are dimensioned to preclude any significant lateral or rotative shifting of plate 20. Base section 81, fixedly connected to armrest 12, is oriented adjacent plate 20, such that pivot pin 13 is matingly received within bore 39 to lie concentrically within ridge 43 and thereby facilitate the pivotal connection of armrest 12 to support structure 14. Also, resistance element 56 is passed through slot 67 and slot 45 to create the distortion of slot 45 upon movement of armrest 12 to cause the desired frictional resistance.

When armrest 12 is positioned horizontally, as shown in FIGS. 1 and 2, resistance pin 56 is passed through and retained within end portion 49. As armrest 12 is swung upwardly about axis 63, resistance pin 56 is swung arcuately along a uniform swing to pass through slot 45. Such movement engenders a frictional resistance as slot 45 distorts and expands to allow passage of element 56. More particularly, the slot 45 resists the movement of element 56 therethrough because of the narrower width and non-uniform shape thereof. This distortion and expansion causes a controlled frictional resistance force which enhances the quality of the armrest adjustment capacity. The resistance force generated by torque control 10 would preferably be on the order of 3.5–6.5 foot pounds; although other amounts of force could be used. When armrest 12 reaches its final upraised position, which would typically align it with the back of the seats (not shown), resistance pin 56 is received within enlarged end portion 51. Resistance pin 56 generally snaps the armrest into its final desired position as the more narrow central portion 53 urges resistance pin 56 to exit into one of the enlarged portions 49, 51.

Figure 14:
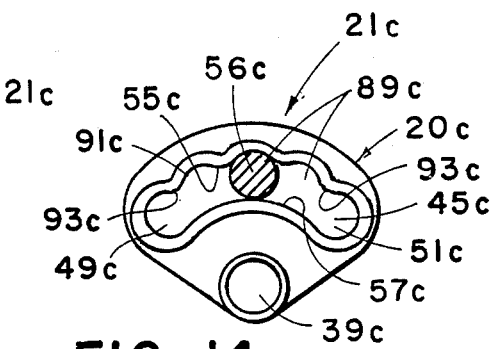
FIG. 14 is a front elevational view of the fourth embodiment of the torque control plate.
Figure 15:
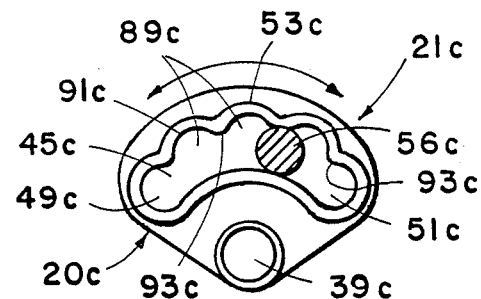
FIG. 15 is a front elevational view of the torque control plate of FIG. 14 in a rotating position.

In another embodiment 21c (FIGS. 13-15), the slot 45c is configured to index and releasably hold a component, such as a vehicular headrest 87 (FIG. 13), in a number of predetermined set positions. More specifically, slot 45c includes a plurality of intermediate enlarged portions 89c in addition to the end portions 49c, 51c. These enlarged portions 89c are similar to end portions 49c, 51c and generally receive guide element 56 without any significant distortion. Preferably, the indexing configuration is defined by a scalloped outer edge 55c having recesses 91c forming the intermediate enlarged portions 89c and nodes or peaks 93c creating the desired frictional resistance due to the narrower width at those points as compared to resistance element 56c.

The operation and assembly of plate 20c is similar to the first embodiment plate 20 except that as headrest 87 is rotated upwardly, resistance pin 56 will be indexed from end portion 49 into the first intermediate enlarged portion 89c in a snapping action as it passes over the first node or peak 93c. This action can be continued until guide element 56 reaches end portion 51 for its final opposite position. Enlarged portions 49c, 51c, 89c and nodes 93c act to releasably but effectively hold the pivoted component 87 in a variety of different positions. For example, this enables a headrest to be positioned intermediately between the two extreme positions (FIG. 13) and still support the weight and forces of an occupant's head.

Of course, it is understood that the above descriptions are those of preferred embodiments of the invention. Various other embodiments, as well as many changes and alterations, may be made without departing from the spirit and broader aspects of the invention as defined in the claims.

The embodiments of the invention in which an exclusive property or privilege is claimed are defined as follows:

1. A torque control for use in conjunction with a component pivotally mounted to a support structure for pivotal movement about a pivot pin, said torque control comprising:
   a cylindrical resistance element adapted to be fixedly mounted to one of a component or structure in spaced relationship to the pivot pin, said resistance element having a predetermined diameter; and
   a member composed of a resilient polymeric material for attachment to the other of the component or structure, said member having an arcuate slot spaced from the pivot pin and receiving therein said resistance element for movement longitudinally therethrough as the component pivots about the pivot pin; said slot having a width dimension relatively smaller than said diameter of said resistance element, whereby a desired frictional resistance is obtained as the component is pivotally moved, and wherein the width of said slot varies continuously along substantially the entire arcuate length through which said resistance element travels to provide a variable frictional resistance.

2. The torque control of claim 1 in which said slot includes at least one enlarged portion having a width substantially equal to said dimension of said resistance element to thereby index and releasably hold the component in a particular orientation when said resistance element is received within said enlarged portion.

3. The torque control of claim 1 in which said slot includes a pair of enlarged end portions each having a width substantially equal to said dimension of said resistance element to thereby index and releasably hold said component in a particular orientation when said resistance element is received within one of said enlarged end portions.

4. The torque control of claim 3 in which said slot includes an inner edge and an outer edge, wherein said outer edge at any one point thereon has a radius of curvature larger than the combined sums of the greatest width of said slot and the radius of curvature at any one point on said inner edge to provide the varying width along substantially the entire arcuate length thereof.

5. The torque control of claim 1 in which said slot includes a plurality of spaced apart enlarged portions along its arcuate length with each enlarged portion having a width substantially equal to said dimension of said resistance element to thereby index and releasably hold the component in a particular orientation when said resistance element is received within one of said enlarged portions.

6. The torque control of claim 1 in which said slot includes an inner edge and an outer edge, wherein said inner edge has a radius of curvature larger than the radius of curvature of said outer edge to define the variable width of said slot, and wherein said resilient member further includes an opening adjacent said inner edge of said slot to permit said inner edge to flex when said resistance element is passed therethrough.

7. The torque control of claim 1 in which said resilient member further includes at least one knob which projects through an opening in the support structure to preclude said resilient member from experiencing any significant swinging motion when the component is moved.

8. A torque control for use in conjunction with a component pivotally mounted to a support structure for pivotal movement about a pivot pin, said torque control comprising:
- a resistance element adapted to be fixedly mounted to one of a component or structure in spaced relationship to the pivot pin, said resistance element having a predetermined width; and
- a member composed of a resilient polymeric material for attachment to the other of the component or structure, said member having an arcuate slot spaced from the pivot pin and receiving therein said resistance element for movement longitudinally therethrough as the component pivots about the pivot pin; said slot having a width dimension relatively smaller than said width of said resistance element, whereby a desired frictional resistance is obtained as the component is pivotally moved; wherein said slot includes a plurality of spaced apart enlarged portions each having a width substantially equal to said dimension of said resistance element to thereby index and releasably hold the component in a particular orientation when said resistance element is received within one of said enlarged portions; and wherein said slot includes an inner edge and an outer edge, wherein said outer edge has a generally scalloped configuration to define said enlarged portions.

9. A torque control for use in conjunction with a component pivotally mounted to a support structure for pivotal movement about a pivot pin, said torque control comprising:
- a resistance element adapted to be fixedly mounted to one of a component or structure in spaced relationship to the pivot pin, said resistance element having a predetermined width; and
- a member composed of a resilient polymeric material for attachment to the other of the component or structure, said member having an arcuate slot spaced from the pivot pin and receiving therein said resistance element for movement longitudinally therethrough as the component pivots about the pivot pin; said slot having a width dimension relatively smaller than said width of said resistance element, whereby a desired frictional resistance is obtained as the component is pivotally moved, said width of said slot continuously varying along substantially the entire length through which said resistance element travels to provide a variable frictional resistance, and further including a base section fixedly attached to said one of said component or support structure, said base section including the pivot pin extending therefrom to be received within a corresponding hole in the other of said component or support structure, and means for fixedly mounting said resistance element.

10. The torque control of claim 9 in which said member is in a juxtaposed, contiguous relationship with said base section and wherein said member further includes a bore sized to matingly receive the pivot pin therethrough.

11. A torque control for use in conjunction with a component pivotally mounted to a support structure for pivotal movement about a pivot pin, said torque control comprising:
- a resistance element adapted to be fixedly mounted to one of a component or structure in spaced relationship to the pivot pin, said resistance element having a predetermined width; and
- a member composed of a resilient polymeric material for attachment to the other of the component or structure, said member having an arcuate slot spaced from the pivot pin and receiving therein said resistance element for movement longitudinally therethrough as the component pivots about the pivot pin; said slot having a width dimension relatively smaller than said width of said resistance element, whereby a desired frictional resistance is obtained as the component is pivotally moved, and further including a base section fixedly attached to said one of said component or support structure, said base section including the pivot pin extending therefrom to be received within a corresponding hole in the other of said component or support structure, and means for fixedly mounting said resistance element;
- said member being in a justaposed, contiguous relationship with said base section and wherein said member further includes a bore sized to matingly receive the pivot pin therethrough;
- said member further having a generally planar configuration and including an annular ridge about said bore which is matingly received within said hole in the other of said component or support structure and matingly receives said pivot pin; and
- an upstanding border about the periphery of said slot which is received through a corresponding opening in the other of said component or support structure.

12. The torque control of claim 9 in which said resistance element includes a threaded end and said means for fixedly mounting said resistance element includes a threaded bore in said base section.

13. A torque control for use in providing a desired frictional resistance to a component pivotally mounted to a support structure, said torque control comprising a generally planar member adapted for attaching to one of a component or support structure, said member being composed of a resilient material and having a bore for receiving therethrough a pivot pin pivotally mounting the component to the support structure, and an arcuate slot spaced from said bore for receiving therethrough an element attached to the other of the component or support structure, said slot defining sidewalls spaced to create a desired resistance force against movement of the element along said slot, and further including an annular ridge surrounding said bore and an upstanding border about the periphery of said slot, each being received within a corresponding opening in said one of the component or support structure to thereby strengthen said planar member and preclude said member from rotating relative to said one of the component or support structure to which it is attached.

14. A torque control for use in providing a desired frictional resistance to a component pivotally mounted to a support structure, said torque control comprising a generally planar member attached to one of a component or support structure, said member being composed of a resilient material and having a bore for receiving therethrough a pivot pin pivotally mounting the component to the support structure and an arcuate slot spaced from said bore for receiving therethrough an element attached to the other of the component or support structure, said slot including an inner edge and outer edge, said outer edge having a generally scalloped configuration to define enlarged portions which substantially matingly receive the element therein to index and releasably hold the component in a particular orientation when the element is received within one of said enlarged portions.

15. The torque control of claim 14 further including an annular ridge surrounding said bore and an upstanding border about the periphery of said slot, each being received within a corresponding opening in said one of the component or support structure to thereby strengthen said planar member and preclude said member from rotating relative to said one of the component or support structure to which it is attached.

16. The torque control of claim 14 in which said planar member is composed of polypropylene.

17. A pivoting assembly having a predetermined frictional resistance to pivoting motion comprising:
 a support structure;
 a component pivotally movable with respect to said support structure;
 a base section fixedly secured to one of said component or support structure, said base section including a pivot pin element and a resistance element having a predetermined width both projecting therefrom in a substantially parallel relationship; and
 a resilient member attached to the other of said component or support structure, said resilient member having an annular hub matingly received within a hole in said other of said component or support structure and matingly receiving said pivot pin element, and an arcuate slot receiving therethrough said resistance element for movement along the length of said slot as said component is pivotally moved, said slot further having a width dimension which is generally narrower than said width of said resistance element to thereby create the desired frictional resistance as said component is pivotally moved.

18. The pivoting assembly of claim 17 in which said slot of said resilient member includes a number of spaced apart enlarged portions each having a width substantially equal to the width of said resistance element to thereby index and releasably hold said component in a particular orientation when said resistance element is received within one of said enlarged portions.

19. The pivoting assembly of claim 18 in which said enlarged end portions of said slot are located at the ends of said slot to thereby index and releasably hold said component into opposite extreme positions when said guide element is received alternatively within said enlarged end portions.

20. The pivoting assembly of claim 19 in which said slot includes an inner edge and an outer edge, wherein said outer edge has a radius of curvature larger than the combined sums of the radius of curvature of said inner edge and the width of said slot, so that the slot has a varying width along the length thereof.

21. The pivoting assembly of claim 18 in which said slot includes an inner edge and an outer edge, wherein said outer edge has a generally scalloped configuration to define said enlarged portions.

22. The torque control of claim 10 in which said member has a generally planar configuration and further includes:
 an annular ridge about said bore which is matingly received within said hole in the other of said component or support structure and matingly receives said pivot pin; and
 an upstanding border about the periphery of said slot which is received through a corresponding opening in the other of said component or support structure.

* * * * *